Feb. 7, 1939.   J. P. FREEMAN   2,145,924
CONTROL UNIT FOR ACCELERATOR AND BRAKE
Filed Dec. 3, 1937   2 Sheets-Sheet 2

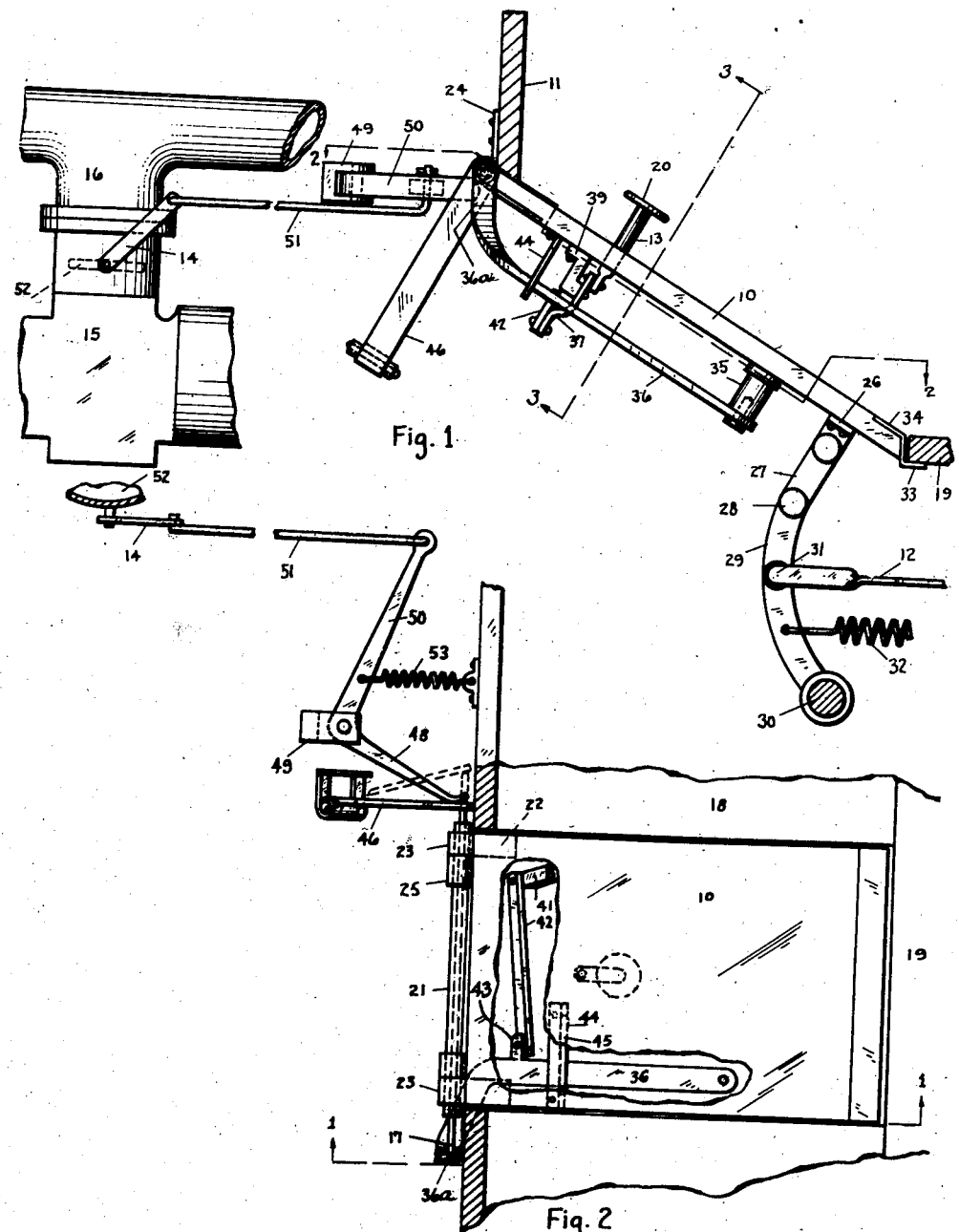

INVENTOR
JOHN P. FREEMAN
BY Martin & Rendell
ATTORNEYS

Patented Feb. 7, 1939

2,145,924

UNITED STATES PATENT OFFICE 2,145,924

CONTROL UNIT FOR ACCELERATOR AND BRAKE

John P. Freeman, Yonkers, N. Y.

Application December 3, 1937, Serial No. 177,970

7 Claims. (Cl. 192—3)

This invention relates to a control unit for controlling the throttle of an internal combustion engine and also controlling the brake for the machine driven by such engines; more particularly the invention relates to a one-foot-operated control unit controlling the throttle of the internal combustion motor of a vehicle and also controlling a brake for said vehicle such as an automobile or the like.

The general purpose of this invention is to provide a new and improved control over such an engine and the machine driven thereby and more particularly over the throttle of an automobile and the brake of such automobile.

The common controls over a motor-driven vehicle such as an automobile include one pedal, usually the left hand pedal, controlling the clutch of the automobile, a second pedal, usually the right hand, controlling the service brake, and thirdly an accelerator member controlling through suitable connections the throttle located between the carburetor and the cylinders of the engine. In this usual arrangement the brake lever is automatically held in inoperative position as by springs or equivalent yieldingly tensioned means. In a similar way the accelerator pedal is yieldingly held to be inoperative and is brought into operation by the driver depressing the accelerator plunger when needed and to the extent needed. When the vehicle is to be stopped or its speed reduced, the usual operation is for the driver to remove his right foot from the accelerator and then shift that foot over to the service brake pedal and press down on such pedal. Meanwhile ordinarily the driver has used his left foot to depress the clutch pedal and so disengage the clutch. This practice of having to lift one foot from the accelerator and shift it over to the brake pedal before the brake can be applied necessarily occupies an appreciable length of time. While most drivers become able to make the shift rapidly and almost unconsciously, still the foot has to be changed from its position over the accelerator to a position to one side thereof and above or rearwardly of the brake pedal and during this interval of time the brake has not been applied. It is true that in this interval of time the throttle has been shifted to closed position and usually the clutch disengaged, but no means have been taken to apply the brakes to reduce the momentum of the vehicle. Under present conditions of rapid driving an automobile goes an appreciable distance even in a fraction of a second. Assuming the car is being driven at a speed of sixty miles an hour, that is a speed of eighty-eight feet in one second. If the interval of time before the brake begins to be applied is only a quarter of a second, the car has gone twenty-two feet and if the lost interval of time is only one-fifth of a second, the car travels about seventeen feet before the brake begins to be applied.

It is the main purpose of this invention in its preferred form to provide a control unit that affords instantaneous operation by the driver's right foot not only to release the accelerator plunger but to apply the brakes at the same time and without having to shift the foot laterally or laterally and rearwardly to a new position. More particularly the purpose of this invention is to provide a movably mounted brake pedal upon which one of the driver's feet may normally rest and to have mounted upon, and movable relative to, said brake pedal the accelerator member where it can be readily operated during normal driving about as is now the common practice, but to have the train of connections from the brake pedal to the brake and the train of connections from the accelerator to the throttle of such character, construction and arrangement as to be entirely independent so that the brake pedal may be depressed without interfering with the accelerator and so that the accelerator can be depressed without interfering with the brake pedal.

A further purpose is to provide a control unit of the character described where the accelerator member is mounted upon and movable relative to the brake pedal but the train of connections leading from the accelerator member to the throttle includes a movable member adapted to move lengthwise of the axis of the brake pedal hinge whereby movement given to the accelerator relative to the brake pedal is transformed into movement in a direction that is not affected by and does not affect movement of the brake pedal. The line of movement of this member in the accelerator connections is through the axis of the brake pedal hinge where obviously longitudinal movement of a member such as a rod may take place without affecting the brake pedal or without being affected by movement of the brake pedal.

A further purpose is to provide a control unit of the character described wherein one of the train of connections from the accelerator includes a rod movable longitudinally of the axis of the brake pedal and more specifically a mechanism wherein the brake pedal hinge includes a hollow or tubular hinge pin through which may freely be longitudinally moved a rod forming one member of the chain or train of connections from the accelerator upon the brake pedal leading to the motor throttle.

Further purposes of the invention are to provide a one-foot operated control unit of the character described which is simple, strong and economical in construction and efficient, reliable and accurate in use and not apt to get out of order.

One form of this invention provides for the same end of the foot (preferably the front end) to normally control the accelerator while the other end of the foot naturally rests upon the other end of the brake pedal, and, when speed is to be reduced or stopped entirely, the end of the foot that has been upon the accelerator is swung laterally in either direction off from the accelerator and at once depressed upon the portion of the brake pedal at either side of the accelerator either by reversing the motion at the ankle or by depressing the whole foot bodily with the ankle joint more or less loose.

Fig. 1 is a longitudinal, vertical, sectional view through the relevant parts of an automobile equipped with the preferred form of a control unit embodying this invention, the section being approximately on line 1—1 of Fig. 2 and so showing the control unit in side elevation.

Fig. 2 is a horizontal sectional view mostly on line 2—2 of Fig. 1, a part of the brake pedal being broken away to show the mechanism therebelow on the section line indicated.

Figure 3:
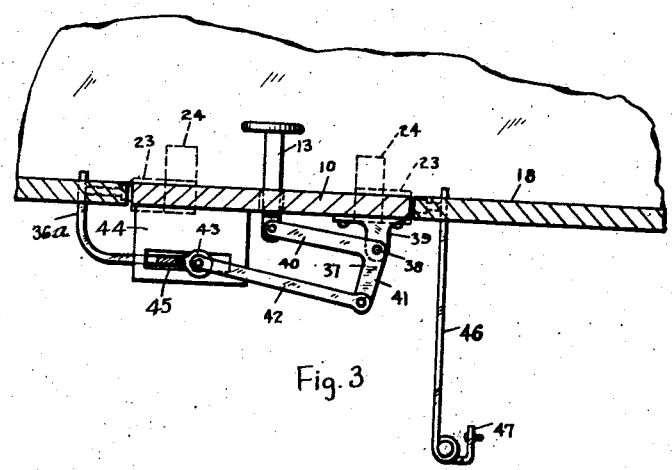
Fig. 3 is a detail sectional view on line 3—3 of Fig. 1 looking in the direction indicated by the arrow and across the brake pedal and adjoining parts of the floor board.

It will be understood of course that the drawings herein illustrate and the detailed description thereof hereinafter set forth describes simply an illustrative embodiment of this invention as applied to a motor-driven automobile and that the invention is applicable to other forms of motor-driven mechanism and particularly may be embodied in varying forms of mechanism and trains of connections from the accelerator to the throttle and from the brake pedal to the brake without departing from the spirit of the claims hereinafter set forth.

Referring to the drawings in a more particular description it will be seen that the control unit of this invention includes a brake pedal 10 hingedly mounted at its upper forward end to a convenient cross member 11 of the automobile and a train of connections leading to the brake link 12 which extends rearwardly to control or bring into operation the brakes of the vehicle in any conventional manner the details of which are not relevant to this invention and so need not be further described.

The other part of the control unit comprises an accelerator member commonly and most conveniently a plunger 13 movably mounted in said brake pedal 10 and having its lower part below the brake pedal attached to the near end of a train of connections extending to the lever 14 of the throttle located in the usual manner between the carburetor 15 and the manifold 16 leading to the cylinders of the engine. This latter train of connections includes a push rod 17 longitudinally and freely movable along the axis of the hinge of the brake pedal whereby motion of the accelerator member may be transmitted to the throttle without affecting the brake pedal and whereby the brake pedal may be depressed from its normal inoperative position to its active and operating position without affecting the action or work of the accelerator.

The brake pedal 10 is preferably located and arranged as herein shown, that is substantially on the level with the inclined portion 18 of the floor board leading in the ordinary automobile from the horizontal or flat floor 19 to the forward upstanding cross member 11. In fact preferably the brake pedal in this control unit is in effect formed by making a desired width of said inclined part of the slanting floor 18 hinged at its forward upper end and functioning as the brake pedal. The advantage of this arrangement is that the angle and level of the inclined floor 18 is the natural position for the foot to rest upon when that foot is actuating the accelerator member 13 and therefore during normal driving operation the driver's foot is resting with its heel upon the brake pedal and its toe resting upon the button 20 at the top of the accelerator member 13 and pressing said accelerator member downwardly as required and to the extent required as is done in the conventional arrangement of the usual present automobile. It will be understood, however, that this invention is not limited to utilizing a width of the inclined floor 18 as the brake pedal but that the brake pedal might be at a different level and even at a different angle from the adjacent inclined portion of the floor as long as the brake pedal was in position to conveniently support the foot when manipulating the accelerator and also in position to at once apply the brakes by depressing the brake pedal without the driver having to move his foot from its former position but simply by reversing the position of the foot at the ankle or pressing sharply down with the heel of the foot. It will be seen that these requirements are best met by utilizing as is shown in the drawings a width of the inclined floor board for the brake pedal.

The forward and upper end of the brake pedal 10 is hingedly mounted with a hollow or tubular hinge pin 21 adapted to have freely slide therethrough reciprocating member such as the push rod 17. Conveniently the hinge may consist of a spaced pair of hinge leaves 22 secured respectively to the forward corners of the brake pedal with their forward ends provided with an eye 23 through which extends said hollow hinge pin 21. Similarly the other co-operating hinge members may consist of hinge leaves 24 secured to the vertical member 11 with the lower end in the form of an eye 25 in line with the eyes 23 and encircling the said hollow hinge pin 21.

From a suitable lug 26 secured to the bottom surface of the brake pedal near its lower end there swingingly extends a short link 27 having its lower end in turn pivotally connected as at 28 to the upper end of the brake lever 29 which is mounted at its lower end upon the cross shaft 30. Intermediate its ends the brake lever 29 has pivotally connected thereto as at 31 the forward end of the brake link 12 already mentioned as having its rearward end connected to the brake mechanism so that forward movement of said link 12 brings the brake into operation. Spring-tensioned means are provided either connected directly to the brake lever or to its train of connections leading to the brake to normally but yieldingly hold the brake lever up in the position shown in Fig. 1, that is normal inactive position and similarly to hold the link 12 in its rearward and inactive position. Such yielding tension means may conveniently consist of a coiled spring 32 having its forward end hooked into the brake lever 29 and its rear end attached to any convenient fixed portion of the automobile so as to normally hold the brake lever 29 in inactive position and the brake pedal 10 in upward inactive position and with sufficient pressure to comfortably support the heel of the operator while the toe of the same foot is manipulating the button of the accelerator member in the usual manner.

Convenient means are provided to prevent the tension of spring 32 from pushing the brake pedal above its normal position as shown in Fig. 1. Such means may consist of a stop 33 extending rearwardly from the lower end and lower surface of the brake pedal so as to engage the lower face of the adjacent portions of the flat floor boards 19. Such stop 33 may conveniently be in the form of a Z-shaped plate 34, the upper flange of which rests upon the upper surface of the brake pedal at its lower end and the lower flange of which engages the lower face of the floor 19 near its front edge.

Upon the lower end of a rigid post 35 extending downwardly from the brake pedal 10 towards its left hand side and preferably below the middle thereof there is fulcrumed the slide lever 36 which extends forwardly and upwardly below the brake pedal and spaced therefrom until it comes nearly into line with the upper end of the brake pedal from which point said sliding lever is extended to the left of the adjacent left hand edge of the brake pedal and then bent upwardly to have its upper end as 36ᵃ bear flat against or otherwise engage the push rod 17 so that a swinging of said sliding lever 36 to the right will operate to move the push rod 17 to the right through the hollow axle hinge pin 21.

Below the brake pedal are provided means operatively connecting the lower end of the accelerator member to a convenient part of the said slide lever 36 so that depression of said accelerator member will move the push rod 17 to the right as seen in Fig. 3. Convenient mechanism for so operatively connecting the lower end of the accelerator member to this slide lever 36 may consist of a bell crank 37 fulcrumed at 38 to bracket 39 down-hanging from the right hand side of the brake pedal and with one arm 40 pivotally connected to the lower end of the accelerator member 13 in a more or less horizontal position and with the other and down-hanging arm 41 of the said bell crank having its lower end pivotally connected to link 42 extending to the left as seen in Fig. 3 and there loosely and pivotally connected to an ear 43 provided upon the slide lever 36. Convenient means are provided in the length of the slide lever 36, that is beneath the brake pedal to hold said lever up and in proper spaced position relative to the brake pedal but to allow the lateral swinging movement of said lever. Such supporting and guiding means may consist of a slotted guide 44 hanging down from the brake pedal and having a slot 45 through which the said lever 36 travels.

Located to the right of the upper right hand corner of the brake pedal there is an arm 46 having its lower end swingingly mounted in a bracket 47 suitably provided upon an adjacent part of the automobile with said arm 46 extending upwardly therefrom and having its upper end bearing against the right hand end of the push rod 17 so that movement of said push rod to the right swings the upper end of said arm 46 in the same direction. Bearing against the other or right hand face of the upper part of this arm 46 there is the end of arm 48 of a bell crank fulcrumed on bracket 49 conveniently provided and located upon some part of the automobile with the other arm 50 of said bell crank extending farther to the right. The arrangement of this bell crank is such that the movement of the push rod to the right and transversely of the automobile moves the free end of the arm 50 forwardly and thus moves forwardly the throttle rod 51 as by the rear end of said throttle rod being pivotally connected to the free end of the said arm 50 while the forward end of said throttle rod 51 is pivotally connected to the free end of the throttle lever 14.

At a convenient and proper place upon this train of connections from the accelerator to the throttle 52 there is provided convenient means for subjecting said train of means to a bias or a yielding tension operating to yieldingly hold the accelerator and throttle and the intermediate means at non-active position but adapted to readily yield on the downward pressure upon the button of the accelerator so as to readily move the throttle when and as needed and to cause the accelerator to spring back to inoperative position as soon as the foot is released therefrom. One form of such spring-tensioned means may consist of a coiled spring 53 having its forward end hooked to the bell crank arm 50 while the rearward end of said spring is attached by suitable bracket to a convenient part of the automobile as to the upright cross member 11. This spring is constructed and mounted so as to tend to move the bell crank arm rearwardly and therewith impart an obvious corresponding movement to the train of connections leading back to the accelerator. This spring in an obvious manner is stretched out and placed under greater tension as the bell crank arm 50 is moved forwardly. In the form of this invention already described in detail it is intended that one foot, usually the right foot, will have its toe or forward portion normally resting upon the accelerator button 20 when the automobile is being positively driven and that the accelerator will be depressed when and as needed by natural movement of the foot at the ankle as is now the usual practice and that the heel or rear part of this same foot will ordinarily and naturally rest upon the lower or rear portion of the brake pedal 10 upon which the accelerator member is mounted. The brake spring 32, however, is strong enough to support the brake pedal in the normal inactive position shown in Fig. 1 as the foot rests thereupon and actuates the accelerator. Obviously if the driver simply wishes to reduce speed or slow up he can do so by raising the forward part of his foot from the accelerator while keeping the rear portion of his foot still upon the brake pedal and without depressing the rear part of the foot sufficiently to bring the brake pedal into operation. It will be seen also that due to the peculiar transmission of the movement originating in the accelerator member and carried forward through that train of connections the accelerator can be depressed or released without in any way affecting the position or movement of the brake pedal and its connections to the brake. In other words, the transfer of motion off of the brake pedal in this case through the push rod 17 traveling through the hollow hinge pin and then onward to the throttle has no tendency to move the brake pedal down or bring it into operation. The very slight twisting motion that the upper end 36a of the slide lever 36 has upon the push rod 17 is obviously inoperative to impart any swinging motion to the brake pedal since it will be understood that the push rod may have its end swing on the flat portion 36a of the swing lever or the said push rod may make a partial rotation within the hollow hinge pin 21 or the hollow hinge pin 21 may turn freely upon either set of the hinges.

Assuming that the automobile is being driven normally with the toe depressing the accelerator member and that a quick stop is to be made the operator at once reverses the position of his foot at the angle by bringing the toe or ball of the foot upwardly thus releasing the accelerator and at the same time the operator pushes sharply down on the heel or rear portion of his foot which instantaneously or at least very rapidly begins to depress the brake pedal and bring the brake into operation. In making this motion it will be seen that the operator of the car does not have to lift his foot bodily from the accelerator and move it up and usually backward and in any event to the one side in order to find the brake pedal. This is the most extreme operation of the device and it will be seen that the operator practically instantaneously begins to bring the brake into operation even as and by the same motion that releases the toe from the accelerator.

However, if the driver when he wishes to make a stop has already released the accelerator and his toe is raised therefrom, but with the heel still resting upon the brake lever; then the only motion that is required is similar motion to press sharply down upon the heel and naturally to raise the toe still further partly so as to get a quicker and more pronounced heel action upon the brake and secondly to make sure that the accelerator is not brought into operation by an unconscious depression of the toe. As the accelerator always travels with the brake pedal unless positively moved in relation thereto, depression of the brake pedal by moving the heel downwardly when the toe is off from the accelerator, will not bring the accelerator into operation.

In this form of the invention it will be seen that the toe or at least the ball of the foot is operating in the present conventional manner upon the accelerator, but that the main braking action is accomplished by depressing the heel or at least the rearward portion of the foot strongly against the lower part of the brake lever.

Figure 4:
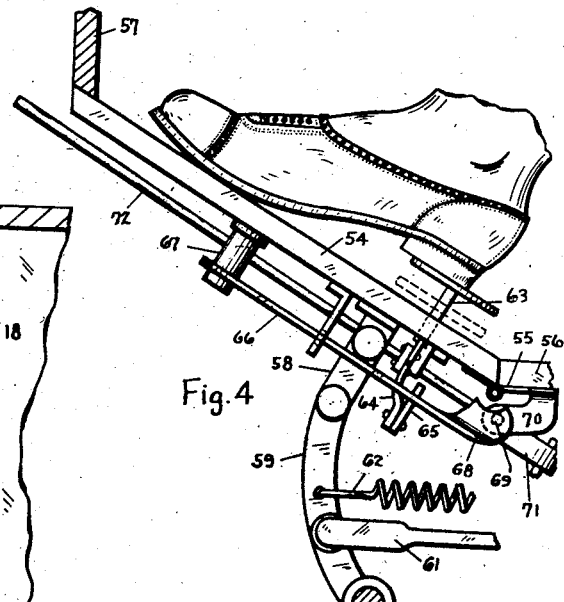
Fig. 4 is a longitudinal vertical sectional view similar to Fig. 1 of a modified form of the invention.

In the modification of this invention as outlined as far as necessary in Fig. 4 the arrangement is such that the forward part of the brake pedal is depressed by the forward part of the foot to actuate the brake and that the accelerator is placed at the rearward and lower portion of the brake pedal and is actuated by the heel or at least the rearward portion of the foot of the operator. In the form of the invention shown in Fig. 4 the brake pedal 54 is hinged as by ordinary conventional hinge 55 to the forward edge of the flat floor 56 and the upper end of the pedal in its upward position comes to or adjacent the cross member 57. The hinge link 58 pivotally depending from the pedal has its lower end pivotally connected to the upper end of the brake lever 59 which has its lower end pivotally mounted upon transverse shaft 60 and communicates its motion through brake link 61 and this train of brake connections is normally held in non-operative position by a contractile spring 62 all substantially as described with regard to the first form of this invention and so not needed to be repeated in detail herein.

The accelerator 63 in this modification is movably mounted in and relative to the lower portion of the brake pedal 54 and the motion given this accelerator member is transferred substantially as described with regard to the first form of this invention as by means of a bell crank 64 which in turn moves a link 65 attached to a sliding lever 66 mounted as by post 67 upon the bottom of the brake pedal. This form of the invention, furthermore, shows a still further modification in that the active or freely swinging end 68 of the sliding lever 66 is made large enough and of arcuate shape as shown in Fig. 4 so that the longitudinal member as push rod 69 which it engages does not have to be mounted upon the axis of the hinge 55 of the mechanism. In this form of the invention the push rod 69 is suggested as being mounted in a pair of brackets 70 with the push rod a short distance below the axis of the hinge 55, such push rod being indicated by the dash lines representing its near end in this view. It will now be seen that when the brake pedal is depressed to its limit the arcuate shaped end 68 of the lever 66 will slide the slight required distance across the end of the push rod but without imparting any longitudinal movement to said push rod. This modification shows a form of the invention outlined in certain of the claims and including the feature that the reciprocating member such as the push rod does not literally have to be upon the axis of the hinge carrying the brake pedal, but it is satisfactory as long as longitudinally moving member moves in a direction normal or perpendicular to the direction in which the brake lever swings. For convenience in compactness and construction it is advisable that this longitudinal member reciprocate in a path which is not only parallel to the axis of the brake hinge, but relatively near thereto. It will be seen, however, that as long as the line of movement of this member of the carburetor control connections is normal or vertical to the direction of movement of the brake pedal, the desired movement can be transmitted off from the brake pedal without being disturbed by the action of the brake pedal and without the action of the brake pedal being disturbed by the throttle control connections. In other words, as long as the motion from the accelerator can be transmitted at one place along a line normal to the direction of movement of the brake pedal the two trains of control means of the control unit will be independent of each other.

At the farther end of the push rod 69 its motion is communicated to the near arm 71 of a bell crank, the further end of which being at substantially right angles thereto, transfers the transverse motion of arm 71 into movement substantially longitudinally of the automobile and practically longitudinally of the brake pedal 54. Such movement is communicated to the long rod 72 which either directly or through intervening bell crank or other suitable mechanism gives the desired movement to the throttle lever.

It will be seen that in this second form of the invention the movement of the accelerator is independent of movement of the brake pedal and that the brake pedal is movable independently of and without affecting movement of the connections from the accelerator to the throttle.

Figure 5:
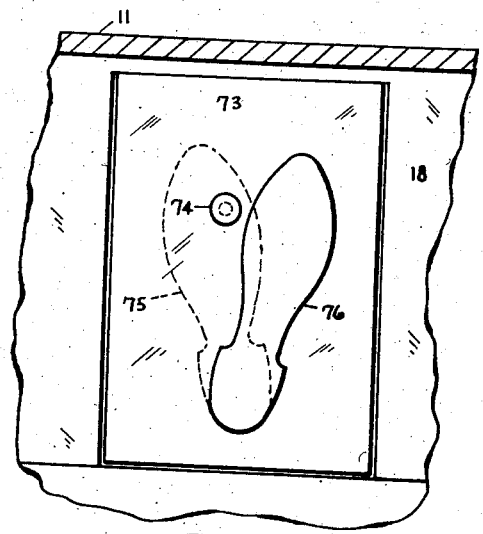
Fig. 5 is a plan view of a brake pedal and an accelerator illustrating a still further modification of the invention.

Fig. 5 is a plan view of a brake pedal and an accelerator mounted thereon and illustrating somewhat diagrammatically a still further modification of this invention. In this form of the invention the brake pedal 73 may be hinged at its forward upper end as shown in Fig. 1 or may be hinged at its rearward lower end as shown in Fig. 4, but preferably, the accelerator member represented in this view by the accelerator button 74 is mounted at the forward and upper part of the brake pedal and movable relative thereto independently of movement of the brake pedal and with the brake pedal able to be moved independently of motion of the accelerator as already described in detail as to the two previous forms of the invention and so not requiring to be repeated herein in detail. The dotted lines 75 represent the outline of the driver's foot as conveniently resting upon the brake pedal with the toe or ball of the foot resting upon the accelerator button when the accelerator is being operated or is to be operated. When a change of speed is to be made or a stop is to be made and the operator desires to apply the brake quickly, he simply swings the forward part of his foot from the dotted line position 75 to the full line position 76 where the ball of the foot is free from the accelerator and he can at once by downward pressure of the ball of the foot exert strong pressure upon the forward part of the brake pedal and bring the brakes very quickly into full operation. While this form of the invention contemplates a lateral movement of the control foot to the extent at least of swinging the ball of the foot sidewise from the accelerator member, this motion is very fast partly because the heel does not have to be lifted from its natural resting position upon the lower part of the brake pedal but in fact the heel member begins to at once exert downward pressure due to reversal of the position of the foot at the ankle. The great saving in time in this form of the invention over the practice heretofore is that as soon as the foot is able to slide sidewise from the pedal the ball of the foot may be at once pushed forward and the foot or the ball of the foot does not have to be bodily raised up and carried over to find the separate brake pedal and then begin to push down upon it. This form of the invention purposely uses a relatively wide brake pedal 73 so that there is plenty of room for the foot to be readily brought into operation during the braking action even though the foot has been swung appreciably from the accelerator. In this view the accelerator is shown at about the middle of the width of a relatively wide brake pedal so that the user can shift his foot either to the right or left of the accelerator and by then dropping the ball of the foot sharply bring the brake into operation. An obvious variation of this construction is to have the accelerator more to one side of the width of the brake pedal, say to the left-hand side on account of natural shift of the foot away from the accelerator with most people would be towards the right. On the other hand as in most of the present conventionally equipped automobiles the right foot has to be moved to the left to shift from the accelerator to the service brake, the accelerator might be placed in the right hand half of the brake pedal and actuation of the brake then made by shifting from the accelerator to the left-hand half of the brake pedal.

What I claim as new is:

1. A one-foot-operated control unit for a motor-driven vehicle comprising a brake pedal mounted by means of a hinge upon an adjacent part of the vehicle and at a convenient position for the foot to normally rest on said pedal and for said pedal to be swung downwardly by pressure from that foot to apply the brake, connections from said brake pedal to bring the brake into operation when said pedal is depressed, means yieldingly holding said brake pedal in non-operating position, an accelerator mounted upon said pedal and movable relative thereto, by the same foot, means operatively connecting said accelerator with the motor throttle and tensioned to yieldingly hold said connecting means and the accelerator in non-operative position but adapted to move the throttle on movement of the accelerator relative to the pedal, said throttle-control means including a rod reciprocatingly mounted on the axis of the pedal hinge for transmitting motion from the accelerator out from the pedal to the throttle independently of movement of the pedal and allowing movement of the pedal independently of movement of the accelerator.

2. A one-foot-operated control unit for a motor-driven vehicle comprising a brake pedal mounted by a hinge at a convenient position for the foot to normally rest thereon and to be swung downwardly by pressure from one end of that foot to apply the brake, connections from said brake pedal to bring the brake into operation when said pedal is depressed, means yieldingly holding said brake pedal in non-operating position, an accelerator mounted upon said pedal and movable relative thereto by the other end of the same foot, means operatively connecting said accelerator with the motor throttle and tensioned to yieldingly hold said connecting means and the accelerator in non-operative position but adapted to move the throttle on movement of the accelerator relative to the pedal, said throttle-control means including a rod reciprocatingly mounted on the axis of the pedal hinge for transmitting motion from the accelerator out from the pedal to the throttle independently of movement of the pedal and allowing movement of the pedal independently of movement of the accelerator.

3. A one-foot-operated control unit for a motor-driven vehicle comprising a brake pedal mounted by a hinge at a convenient position for the foot to normally rest thereon and to be swung downwardly by pressure from the heel end of that foot to apply the brake, connections from said brake pedal to bring the brake into operation when said pedal is depressed, means yieldingly holding said brake pedal in non-operating position, an accelerator mounted upon said pedal and movable relative thereto by the front end of the same foot, means operatively connecting said accelerator with the motor throttle and tensioned to yieldingly hold said connecting means and the accelerator in non-operative position but adapted to move the throttle on movement of the accelerator relative to the pedal, said throttle-control means including a rod reciprocatingly mounted on the axis of the pedal hinge for transmitting motion from the accelerator out from the pedal to the throttle independently of movement of the pedal and allowing movement of the pedal independently of movement of the accelerator.

4. A one-foot-operated control unit for a motor-driven vehicle comprising a brake pedal mounted by a hinge upon an adjacent part of the vehicle and at a convenient position for the foot to normally rest thereon and adapted to be swung downwardly by pressure from that foot to apply the brake, connections from said brake pedal to bring the brake into operation when said pedal is depressed, means yieldingly holding said brake pedal in non-operating position, an accelerator mounted upon said pedal and movable relative thereto by the same foot, means operatively connecting said accelerator with the motor throttle and tensioned to yieldingly hold said connecting means and the accelerator in non-operative position but adapted to move the throttle on movement of the accelerator relative to the pedal, said throttle-control means including a rod reciprocatingly mounted for movement parallel to the axis of the pedal hinge for transmitting motion from the accelerator out from the pedal to the throttle independently of movement of the pedal and allowing movement of the pedal independently of movement of the accelerator.

5. In an accelerator and brake control unit for an internal combustion engine and a machine operated therefrom, the combination of a brake pedal mounted by means of a hinge on an adjacent fixed part and normally yieldingly held non-operative but adapted to be moved to bring the brake into operation, connections from said pedal to the brake, an accelerator mounted upon said pedal and movable relative thereto and means operatively connecting said accelerator with the engine throttle and tensioned to yieldingly hold said accelerator and its connecting means in non-operative position but adapted to actuate the throttle on movement of the accelerator relative to the pedal, said throttle-control means including a push rod reciprocatingly mounted parallel to the axis of said brake pedal hinge whereby movement of each train of the control unit is independent of the other.

6. A control unit for the throttle of an internal combustion engine and the brake of the vehicle driven thereby comprising a brake pedal swingingly mounted by a hinge and normally yieldingly held non-operative but adapted to be moved by one foot of the driver to bring the brake into operation, connections from said pedal to the brake, an accelerator mounted upon said pedal and movable relative thereto by the same foot of the driver and means operatively connecting said accelerator with the engine throttle and tensioned to yieldingly hold said accelerator and its connecting means in non-operative position but adapted to actuate the throttle on movement of the accelerator relative to the pedal, said throttle-control means including a push rod reciprocatingly mounted parallel to the axis of the brake pedal hinge whereby movement of each train of the control unit is independent of the other.

7. A control unit for the throttle of an internal combustion engine and the brake of the vehicle driven thereby comprising a brake pedal swingingly mounted by a hinge and normally yieldingly held non-operative but adapted to be moved to bring the brake into operation, connections from said pedal to the brake, an accelerator mounted upon said pedal and movable relative thereto and means operatively connecting said accelerator with the engine throttle and tensioned to yieldingly hold said accelerator and its connecting means in non-operative position but adapted to actuate the throttle on movement of the accelerator relative to the pedal, said throttle-control means including a push rod reciprocatingly mounted parallel to the axis of the brake pedal hinge whereby movement of each train of the control unit is independent of the other.

JOHN P. FREEMAN.